US008201335B2

(12) United States Patent
Martin

(10) Patent No.: US 8,201,335 B2
(45) Date of Patent: Jun. 19, 2012

(54) SELF-CONTAINED VACUUM SAW

(76) Inventor: Charles B. Martin, Washington, IL (US)

( * ) Notice: Subject to any disclaimer, the term of this patent is extended or adjusted under 35 U.S.C. 154(b) by 0 days.

(21) Appl. No.: 12/546,005

(22) Filed: Aug. 24, 2009

(65) Prior Publication Data
US 2009/0313834 A1 Dec. 24, 2009

Related U.S. Application Data

(60) Division of application No. 12/069,528, filed on Feb. 11, 2008, now Pat. No. 7,578,063, which is a continuation of application No. 10/939,440, filed on Sep. 14, 2004, now Pat. No. 7,328,512.

(51) Int. Cl.
B27B 9/00 (2006.01)
B27G 3/00 (2006.01)

(52) U.S. Cl. .............................. 30/124; 30/390; 30/391

(58) Field of Classification Search .................. 30/124, 30/133, 376, 390, 391; 144/252.1, 252.2; 451/456
See application file for complete search history.

(56) References Cited

U.S. PATENT DOCUMENTS

| 3,262,472 | A | * | 7/1966 | McCarty et al. | ................. 30/376 |
| 3,787,973 | A | | 1/1974 | Beisch et al. | |
| 3,882,598 | A | | 5/1975 | Earle et al. | |
| 4,241,505 | A | | 12/1980 | Bodycomb, Jr. et al. | |
| 4,999,916 | A | * | 3/1991 | Sistare | ............................. 30/376 |
| 5,010,651 | A | * | 4/1991 | Techter et al. | .................. 30/376 |
| 5,074,044 | A | | 12/1991 | Duncan et al. | |
| 5,271,155 | A | * | 12/1993 | Fuchs et al. | ...................... 30/376 |
| 5,327,649 | A | | 7/1994 | Skinner | |
| 5,445,056 | A | | 8/1995 | Folci | |
| 5,452,515 | A | * | 9/1995 | Schilling | .......................... 30/376 |
| 5,461,790 | A | | 10/1995 | Olstowski | |
| 5,774,992 | A | | 7/1998 | Lindenmuth | |
| 6,219,922 | B1 | | 4/2001 | Campbell et al. | |
| 6,263,584 | B1 | | 7/2001 | Owens | |
| 6,447,379 | B1 | | 9/2002 | Gromko et al. | |
| 6,557,261 | B1 | | 5/2003 | Buser et al. | |
| 6,827,640 | B2 | | 12/2004 | Bures et al. | |
| 7,328,512 | B2 | | 2/2008 | Martin | |
| 7,578,063 | B2 | * | 8/2009 | Martin | ............................ 30/124 |
| 2004/0261592 | A1 | | 12/2004 | Chen | |
| 2010/0269353 | A1 | * | 10/2010 | Martin | ............................ 30/124 |

OTHER PUBLICATIONS

Search Report for International Application No. PCT/US04/38463 Mar. 31, 2005.
Submission by Inventor to Milwaukee Tool Corp. Apr. 2003 in the parent U.S. Appl. No. 10/939,440.

* cited by examiner

Primary Examiner — Hwei C Payer
(74) Attorney, Agent, or Firm — Howard & Howard Attorneys PLLC

(57) ABSTRACT

A portable cutting apparatus. The apparatus includes a motor and a cutting blade driven by the motor. A protective housing encloses at least a portion of the cutting blade. A vacuum impeller is disposed in a vacuum housing to generate airflow to move dust and debris created by the cutting blade into a removable vacuum bag. At least one vacuum tube directs the airflow from the protective housing to the vacuum housing. The motor operates both the cutting blade and the vacuum impeller. A bellows interconnects the protective housing and a lower platform. The lower platform pivots relative to the cutting blade about a pivot axis that is outwardly spaced from and parallel to a cutting plane defined by the cutting blade.

7 Claims, 6 Drawing Sheets

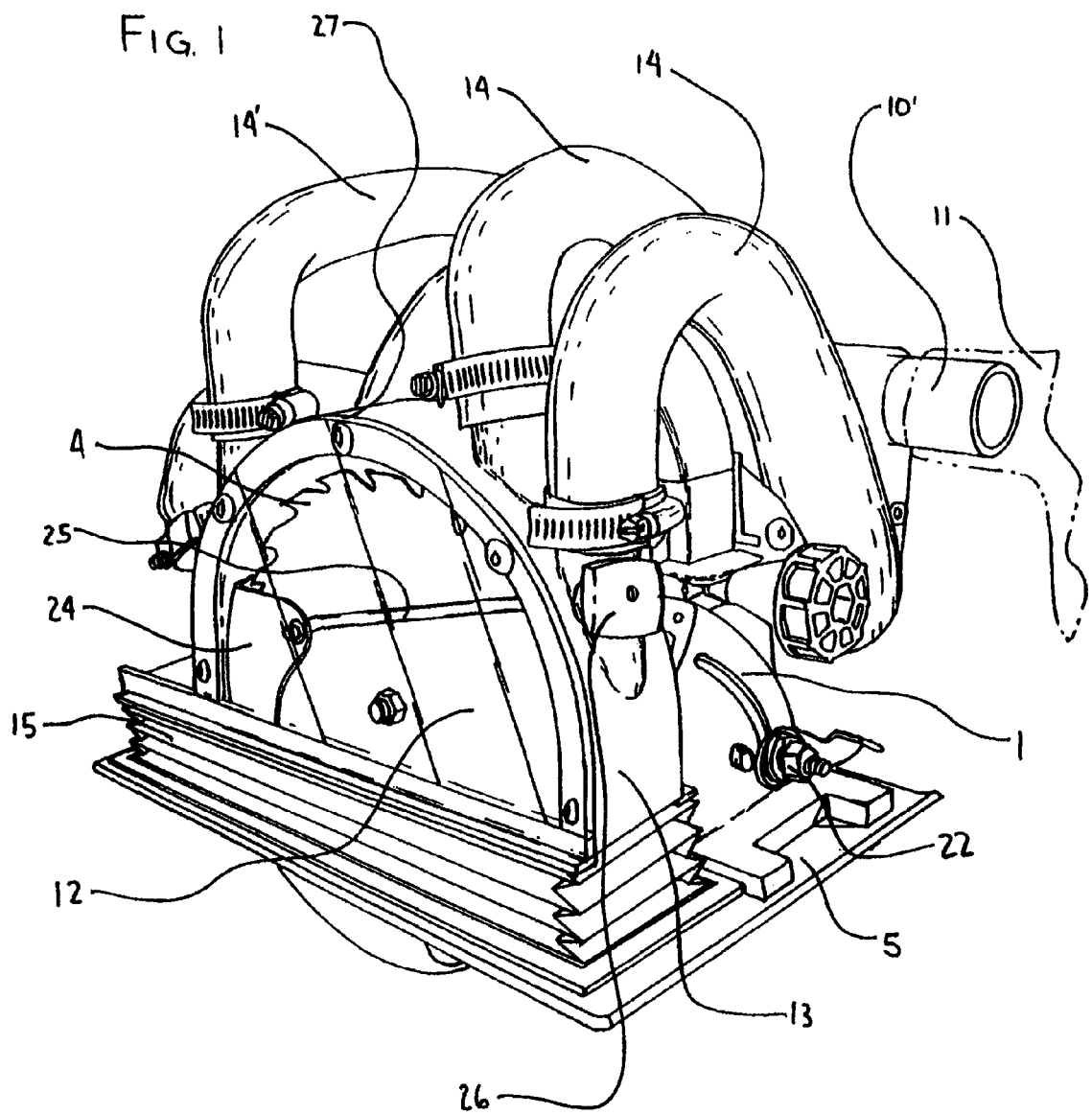

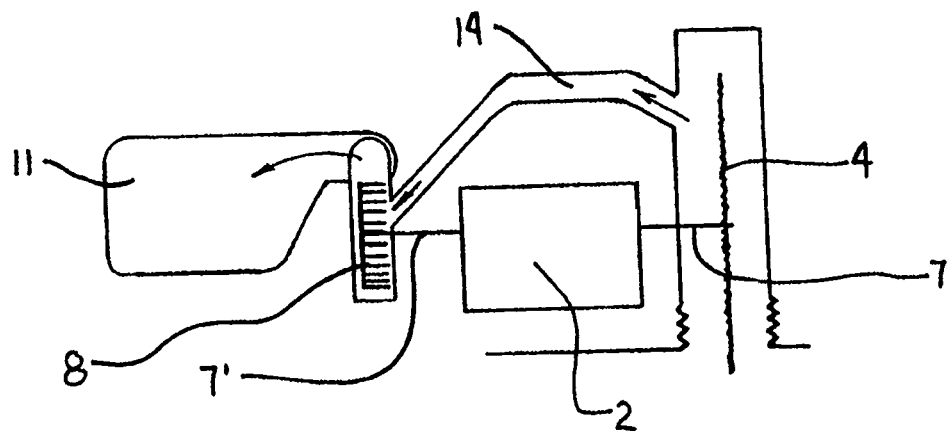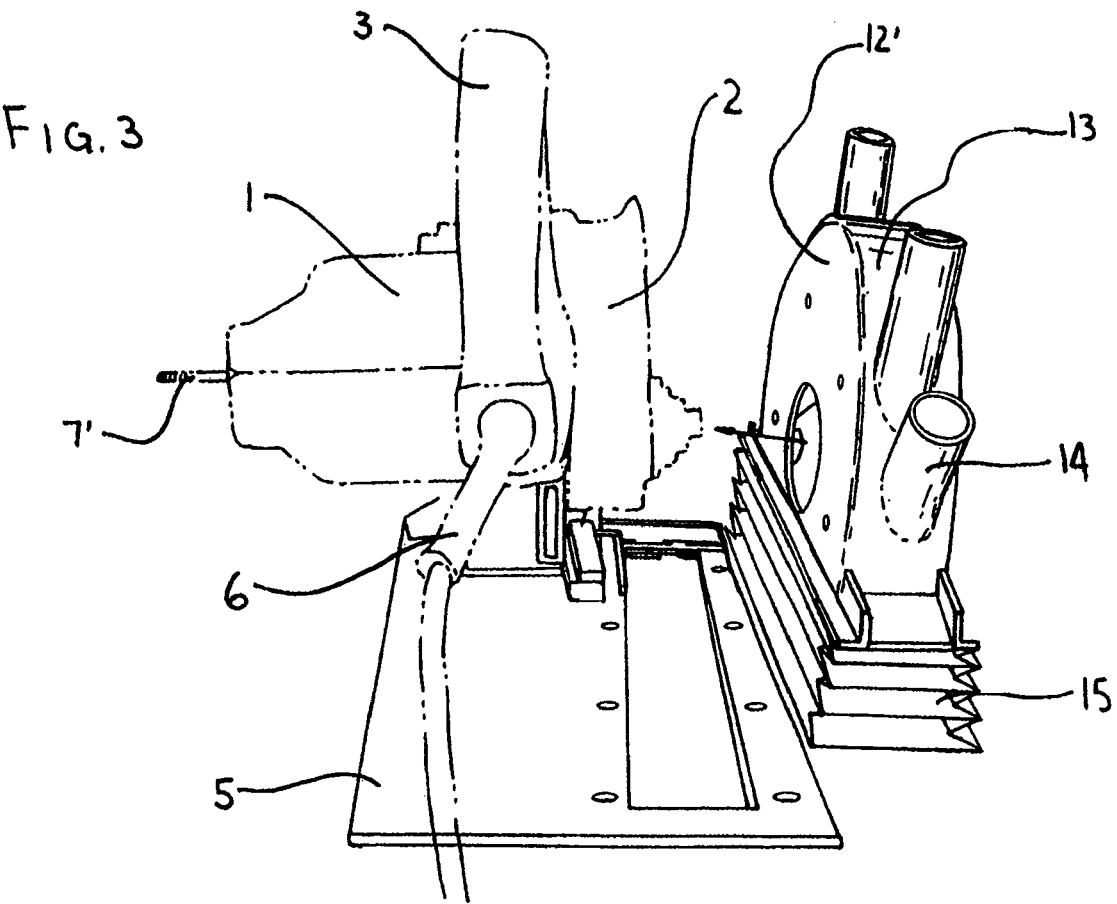

US 8,201,335 B2

SELF-CONTAINED VACUUM SAW

RELATED APPLICATIONS

This application is a divisional of U.S. patent application Ser. No. 12/069,528, filed Feb. 11, 2008, now U.S. Pat. No. 7,578,063, which is a continuation of U.S. patent application Ser. No. 10/939,440, filed Sep. 14, 2004, now U.S. Pat. No. 7,328,512, the entirety of both of which are hereby incorporated by reference.

FIELD OF THE INVENTION

This invention relates to the field of carpentry and sawing. More particularly, a self-contained vacuum saw is presented which picks up dust and debris during the operation of the saw.

BACKGROUND OF THE INVENTION

In the carpentry field, it has been commonplace to use saws of various types. From the first primitive hand saw, to tree saws, to electrically operated saws such as jigsaws or circular saws, the carpentry and building trades often utilize such mechanical devices. One major drawback of these saws during construction work is that much dust and debris can accumulate as a result of cutting wood, dry wall, or concrete. Particularly for inside work, the dust that can accumulate in a room often would require hours of clean-up after the initial construction phase and the sawing is completed.

During inside work, and particularly in areas where remodeling is being done, the dust problem poses quite a quandary for the workmen. In remodeling, the workmen are often required to remove and replace a door, window, or wall or to install and cut dry wall in a closed room. These rooms often have furniture and electronic appliances sensitive to dust accumulation. Fine dry-wall dust accumulation can cause many problems. One approach to solving this problem would be to remove all of the furniture in the room or to cover the furniture or electronic appliances with tarps or plastic. This, of course, would require many man hours and would be an expensive proposition. It is an object of this invention to provide a self contained vacuum saw that would eliminate approximately ninety percent or more of the dust accumulated as a result of the construction process.

Although certain vacuum devices have been attached to circular saws or concrete saws, these devices are not self contained and do not allow the workman to transport his circular saw to and around the worksite. For example, table saws at hardware stores may be attached to an in-house vacuum system. However, the table saw is stationary and cannot be transported to any other site. In addition, the vacuum system on such saws requires a separate power source to operate the vacuum. It is another object of this invention to provide a self contained circular saw which may be transported to the worksite. Another object of this invention is to provide a self-contained circular vacuum saw which may be transported to a worksite and which is powered from the motor of the circular saw itself.

Often, when a circular saw or other type of electrical saw is used outside, a power source such as an electric cord or gasoline electric generator is required in order to power the saw. It is a still further object of this invention to provide a self-contained vacuum saw that can be used utilizing only one electrical source of power to operate both the saw blade and the attached vacuum unit.

Other objects of this invention will become apparent upon reading the below described specification.

SUMMARY OF THE INVENTION AND ADVANTAGES

A portable cutting apparatus has as its primary objective the collection of dust and debris from a cut being made with a cutting blade. While there are many types of cutting devices, the below described device is a circular saw as an example. However, this circular saw is an illustration only and is not meant to limit the scope of the disclosure. The invention disclosed herein has many applications to other portable cutting devices.

A portable cutting apparatus is provided that comprises a body including a motor having a drive shaft. A cutting blade is coupled to the drive shaft for rotating during operation of the motor. The cutting blade defines a cutting plane. A protective housing encloses at least a portion of the cutting blade. The protective housing includes a transparent section for viewing the cutting blade during rotation of the cutting blade. A bellows is connected to the protective housing and extends downwardly therefrom such that the protective housing and the bellows define a blade chamber for the cutting blade. A vacuum impeller is operably coupled to the motor and is rotatable during operation of the motor to generate airflow. A vacuum housing encloses the vacuum impeller. The vacuum housing defines at least one inlet configured to direct the airflow into the vacuum housing and an outlet configured to direct the airflow out of the vacuum housing. At least one vacuum tube directs the airflow from the protective housing to the vacuum housing. A bag is coupled to the vacuum housing to collect cutting debris and dust present in the airflow moving through the vacuum housing by the vacuum impeller. A lower platform is connected to the bellows and defines an opening receiving the cutting blade therethrough. The lower platform is pivotally connected to the body about a pivot axis spaced outwardly from and parallel to the cutting plane such that the lower platform pivots relative to the body outside of the cutting plane.

BRIEF DESCRIPTION OF THE DRAWINGS

FIG. 1 is a front perspective view of the device.

FIG. 2 is a schematic view of the device showing key elements.

FIG. 3 is an exploded view of the saw blade chamber, showing the enclosure disassembled from the saw itself.

DETAILED DESCRIPTION OF THE INVENTION

Figure 4:
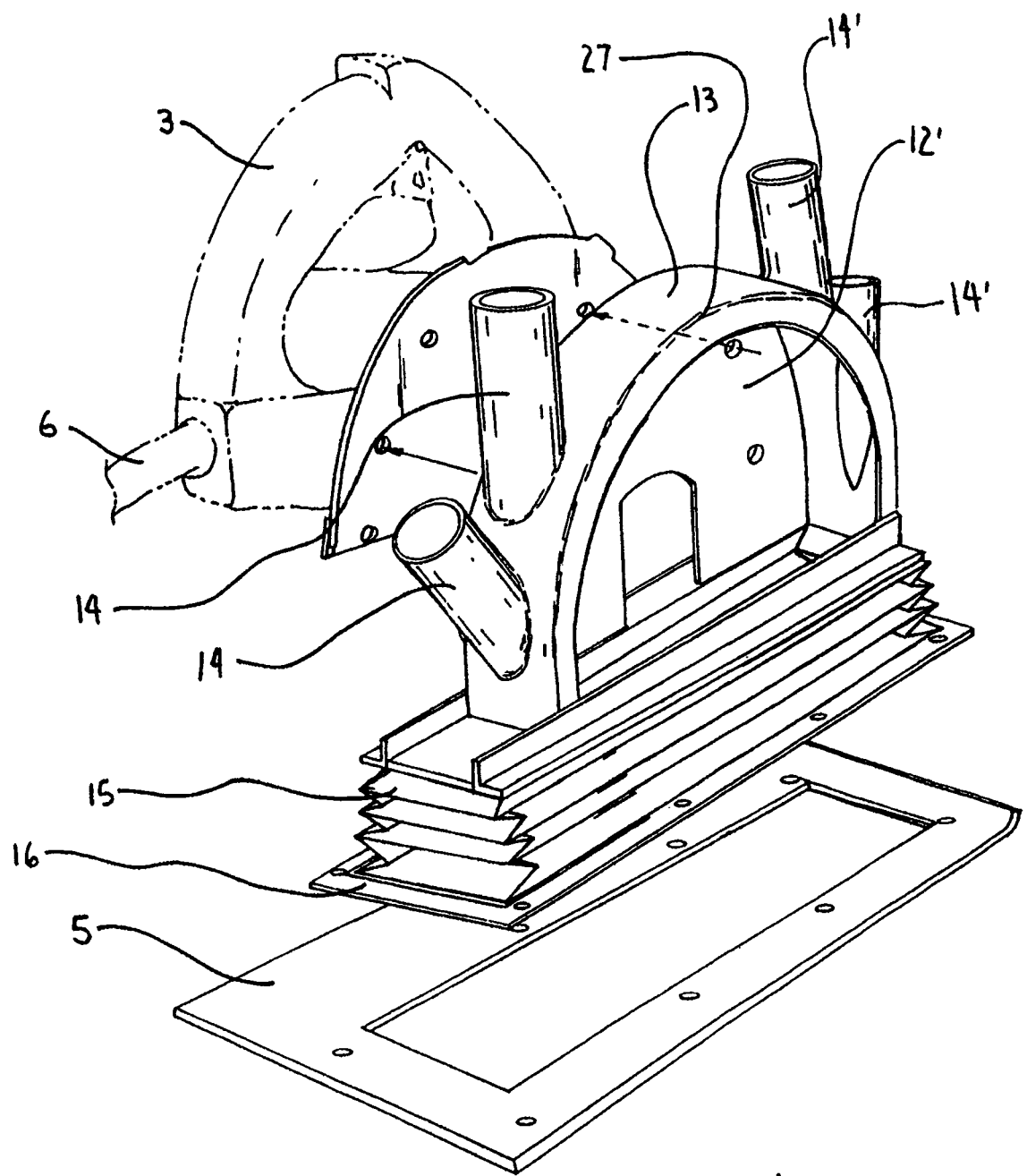
FIG. 4 is an outside perspective view of the saw blade enclosure and bellows.

A self-contained vacuum saw, shown in its full embodiment in FIG. 1 is presented. The self-contained vacuum saw is a modification of the standard circular saws currently being used in the building and construction trades. Such a standard circular saw has a body 1 that contains an electric motor 2, a saw handle 3, a circular saw blade 4, and a lower saw platform 5. The saw blade 4 defines a cutting plane. The lower saw platform 5 is pivotably connected to the saw body and has an inner side near the motor 2 and an outer side outside the saw blade 4. The circular saw of the preferred embodiment has an electric motor and is powered through the saw cord 6. These well-known elements of the standard circular saw are best shown in FIGS. 1 through 3.

Figure 5:
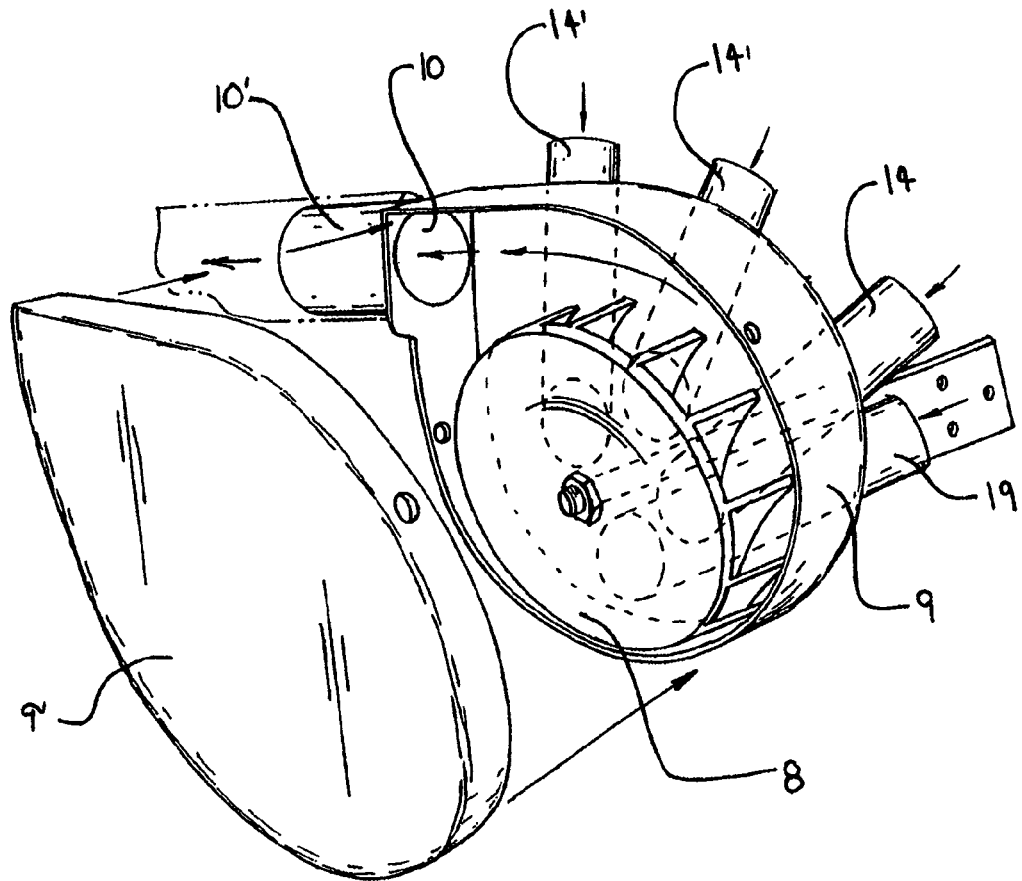
FIG. 5 is a perspective exploded view of the vacuum chamber.

As shown schematically in FIG. 2, the electric motor 2 turns a blade drive shaft or armature 7 that in turn is connected to the saw blade 4. The electric motor in the instant device also turns a drive shaft vacuum extension 7' (the same armature) which is connected to a vacuum impeller 8. The vacuum impeller 8 is surrounded by a vacuum impeller housing 9. The vacuum impeller and housing is best shown in FIG. 5. The impeller 8 has a vacuum impeller main housing 9 attached to the saw body 1 and a vacuum impeller outer housing 9'. The outer housing 9' is removably attached to the permanently attached main housing 9.

The vacuum housing (9 and 9') contains a vacuum housing exhaust port 10. This exhaust port 10 is adapted to receive the dust and debris pulled into the vacuum housing by the impeller. This material is then discharged through the exhaust port 10.

Attached to the outer portion of the exhaust port 10 is a metal exhaust port tube 10'. Attached to the exhaust tube 10' is a vacuum bag 11. The type of vacuum bag 11 used on this particular device must be tighter than the normal bags on the market. The bags could be disposable for fine dust accumulated such as in drywall cutting or washable for coarser work such as cutting materials like wood. Particular types of bags utilized to catch and collect fine debris such as that produced in drywall cutting are in common use in the industry and are well known in the art.

Turning now to FIGS. 2 and 3, the saw blade chamber is shown. The saw blade chamber creates an essentially sealed chamber around the saw blade. The upper blade housing of the saw blade chamber comprises a semi-circular saw blade outer enclosure plate 12 (FIG. 1). The upper blade chamber includes a semi-circular inner enclosure plate 12'. A saw blade chamber shoulder 13 connects outer 12 and inner 12' blade plates. The outer plate 12 is clear, as best shown in FIG. 1. This clear outer plate 12 allows the workmen to see the blade and to trace the path of the blade as the cut is being made. The upper blade housing surrounds the upper portion of the blade 4.

Attached to the circular shoulder 13 of the saw blade chamber is a plurality of vacuum tubes 14. These vacuum tubes are connected between the blade chamber and the vacuum housing. The preferred embodiment shown herein has four hoses 14 that must be strategically positioned to allow for the most efficient collection of dust and debris. After much experimentation, it has been found that a single hose simply introduced at one part of the saw blade chamber is inefficient and would not be effective in gathering the amount of dust and debris accumulated during a saw cut.

In one embodiment of this device, the front two hoses 14' vacuum up most of the dust. However, these front hoses 14' must be strategically placed. In the preferred embodiment herein, the front two vacuum hoses 14' are located at approximately two o'clock and three o'clock on a twelve o'clock dial on the circumference of the shoulder 13, with reference being had to FIG. 4. On FIG. 4, if one places the twelve o'clock high position on the saw blade chamber at the apex 27 of the semi-circle, the front two vacuum hoses 14' would be located at the two o'clock and three o'clock position.

Other hoses should also be attached to the saw blade chamber. In one embodiment, as best shown in FIG. 4, two additional vacuum tubes 14 would be located at the ten o'clock and nine o'clock position.

Figure 7:
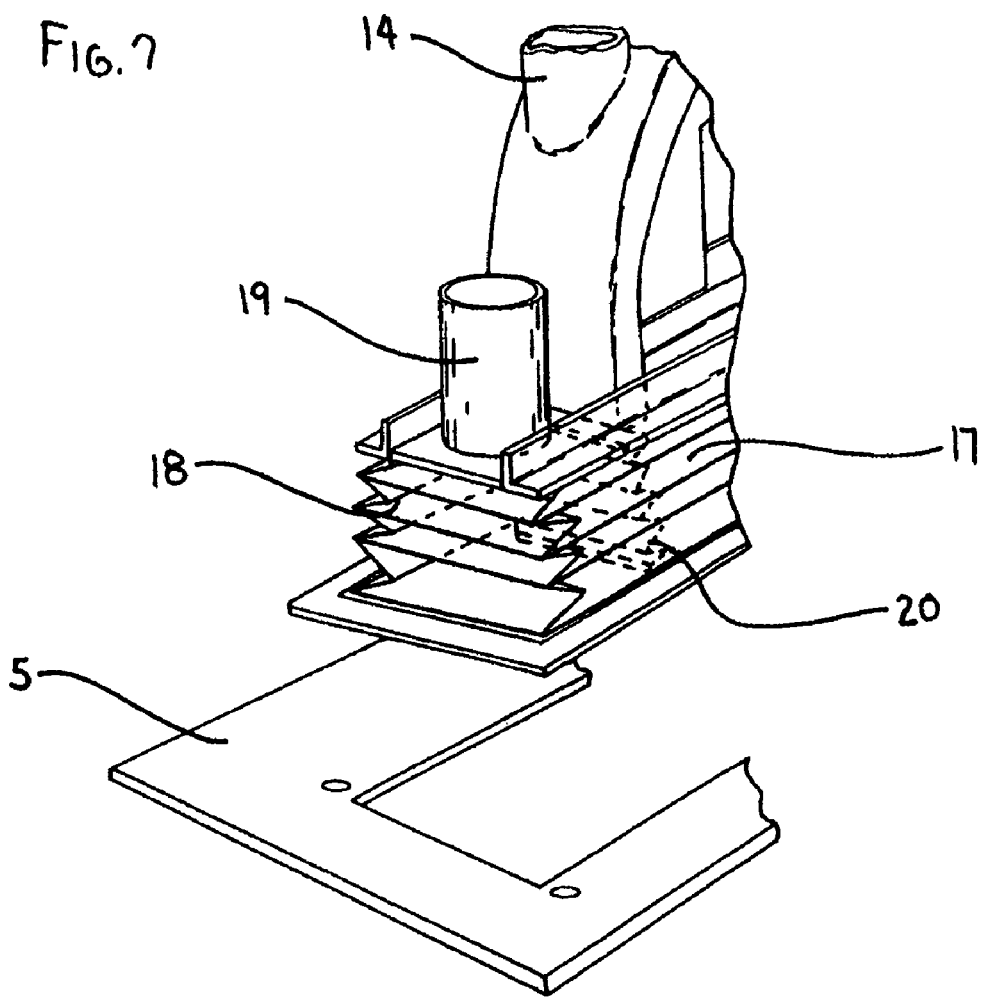
FIG. 7 is a partial perspective end view of the saw blade enclosure, showing the placement of the fourth tube at the back edge of the saw blade.
Figure 8:
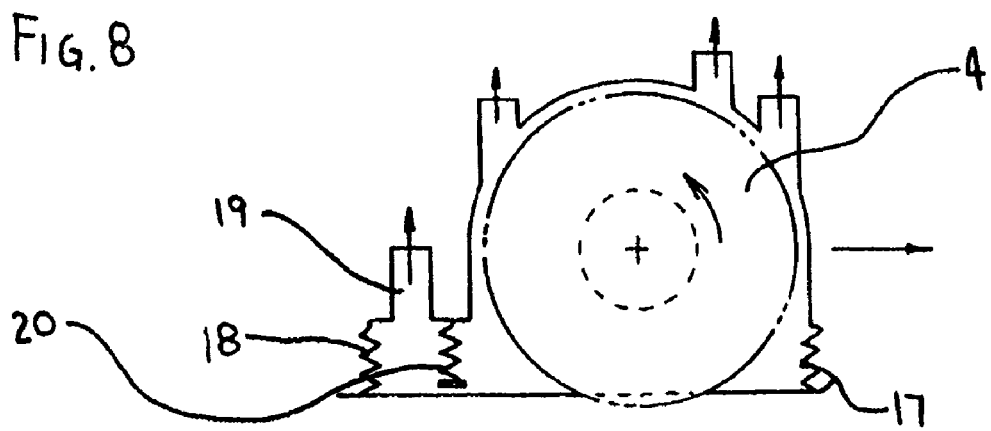
FIG. 8 is a side schematic view of the embodiment shown in FIG. 7, which details the separate bellows compartments for this embodiment.

It has also been found that moving the nine o'clock vacuum hose to an alternate position, as shown in drawing FIGS. 7 and 8 would be a beneficial placement of the vacuum hoses. This alternate placement of the nine o'clock vacuum hose will be described later in this specification.

In order to complete the saw blade chamber, a lower saw blade bellows 15 is attached to the bottom part of the saw blade chamber as best shown in FIG. 4. The upper blade housing and lower bellows create the blade chamber.

The bellows 15 is an accordion-style flexible and bendable bellows as shown in the drawing figures. The bellows 15 needs to be flexible and bendable in order for the adjustable saw blade to be maneuverable within the saw blade chamber to adjust for angles and depths of cut. A lower bellows attaching bracket 16, as shown in FIG. 4, may be attached to the lower part of the bellows in order for the entire bellows unit 15 to be attached to the saw lower platform 5. Suitable screw holes are provided in the lower bellows bracket 16. Corresponding holes are found in the saw lower platform 5.

Another variation of the placement of the vacuum hoses 14 of this device is shown in FIGS. 7 and 8. In this variation, the lower chamber created by bellows 15 is divided into two chambers 17 and 18. A larger, front chamber 17, as best shown in FIGS. 7 and 8, has three vacuum tubes attached. A second, smaller, rear bellows chamber 18 has one vacuum tube, in this embodiment 19, to collect the dust and debris from the back end of the saw blade. A small, flexible separation wall 20 separates front 17 and rear 18 bellows chambers. This upper part of this separation wall 20 is connected to the saw blade chamber but is not connected to the lower saw platform 5. A small space between the lower part of the separation wall 20 and the lower saw platform 5 allows any remaining debris not already pulled up by the front hoses to be pulled into the rear bellows chambers 18 and discharged by the rear bellows chamber vacuum tube 19.

Once the bellows are attached to the upper part of the saw blade chamber, the saw blade is almost completely enclosed. (Due to the fact that the saw blade must move and may not always be completely flush against the work piece, the chamber is not always one hundred Percent sealed. However, the chamber does provide a virtual seal for the saw blade.) The saw blade chamber is created by the upper semi-circular saw blade shoulder 13, the outer plate 12, the inner plate 12', the bellows 15 and the lower saw platform 5. In combination, these elements create a saw blade chamber.

Figure 6:
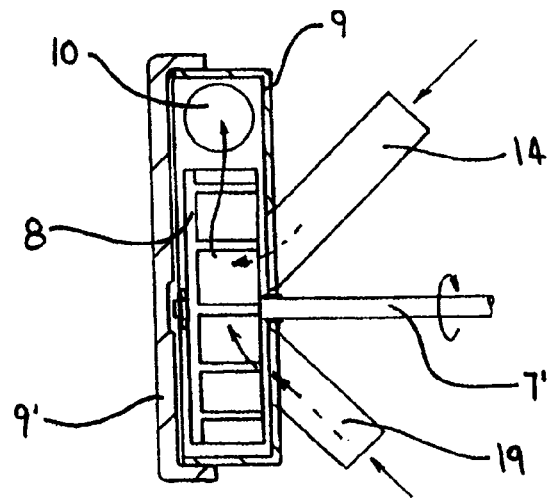
FIG. 6 is a side cut-away view of the vacuum chamber shown in FIG. 5, showing the direction of airflow.

When the blade 4 is turned by the electric motor and cuts the work piece, the dust and debris created is pulled up into the vacuum tubes 14 and 14' by the impeller and is deposited in the vacuum bag 11. This process is best shown in the schematic drawing FIG. 2 and by the diagram shown in FIG. 6. In FIGS. 2 and 6, the arrows show the direction of airflow and the direction of travel of the dust and debris.

As shown in FIG. 6, the dust and debris created by the blade is vacuumed into vacuum housing 9 in the direction of the arrows. Each of the vacuum tubes 14 and 14' have their outlets at approximately, or as near as possible, to the center of the impeller 8. It has been shown through much experimentation that the introduction of the outlet end of the vacuum tubes near the center of the impeller is preferred. As the dust and debris is vacuumed by the impeller into the vacuum housing 9 the dust and debris is discharged through exhaust port 10 and into the vacuum bag 11. The vacuum bag is detachably attached to the device so that it may be emptied as necessary.

Another refinement to this device is illustrated in FIG. 1. Each circular saw blade has a lower blade guard 24. This lower blade guard 24 rotates as the blade moves through the material to be cut and must be pushed out of the way before the blade encages the working piece. Normally, this is done by means of a lever on the side of the lower blade guard. However, since the outer side of the blade 4 is now fully contained within the saw blade chamber, an alternate means of rotating the lower blade guard 24 is required. This is accomplished using a lower blade guard rod 25 that is contained within the blade chamber. The rod has a first end connected to the blade guard 24 as shown in drawing FIG. 1. This lower blade guard rod 25 is also attached at a second end to lower blade guard lever handle 26, which is positioned on the outside of the saw blade chamber. By pulling handle 26, lower blade guard 24 may be rotated so that the saw may be placed on the work piece for cutting.

Figure 9:
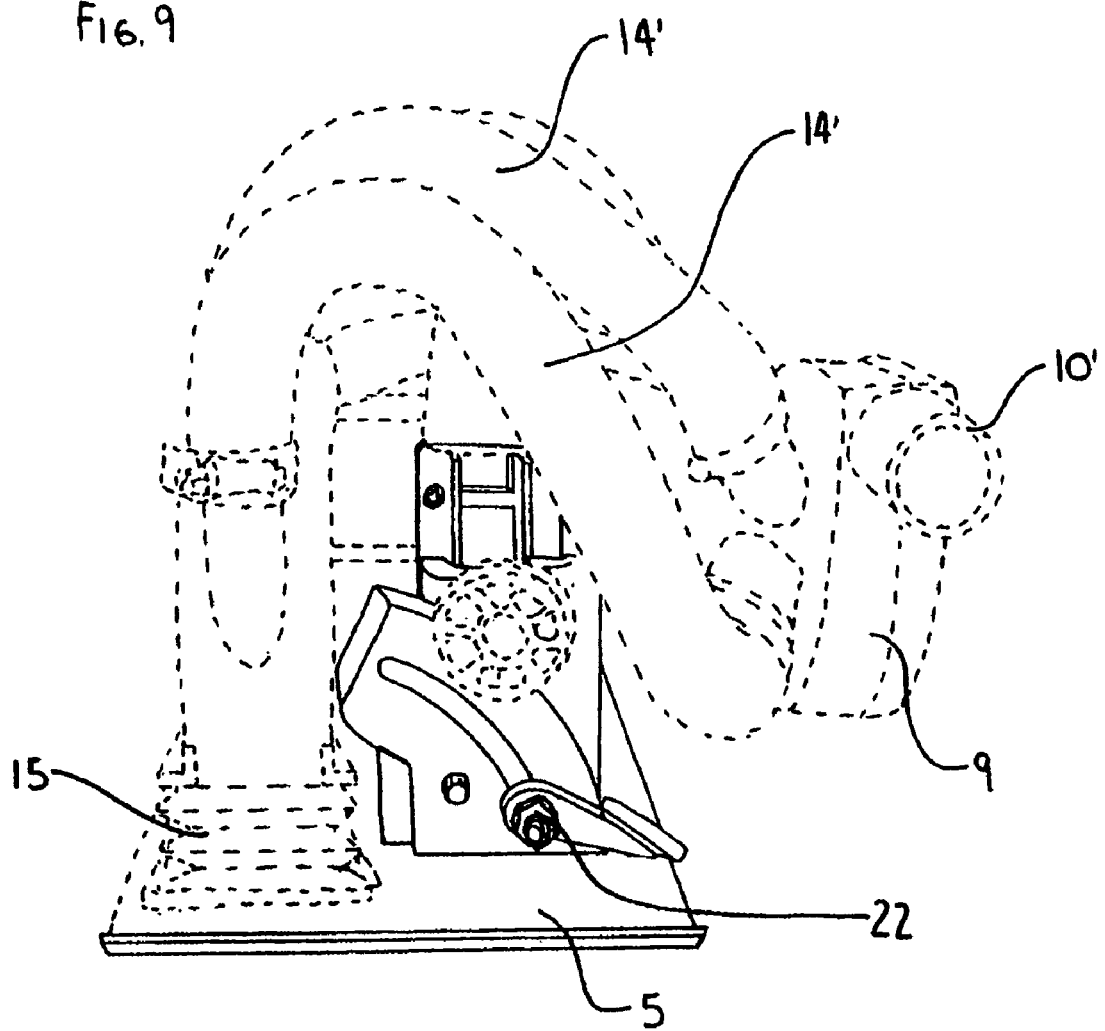
FIG. 9 is a front view of the self-contained vacuum saw shown in FIG. 1, particularly illustrating the mechanism used to change the pivot of the lower saw platform.
Figure 10:
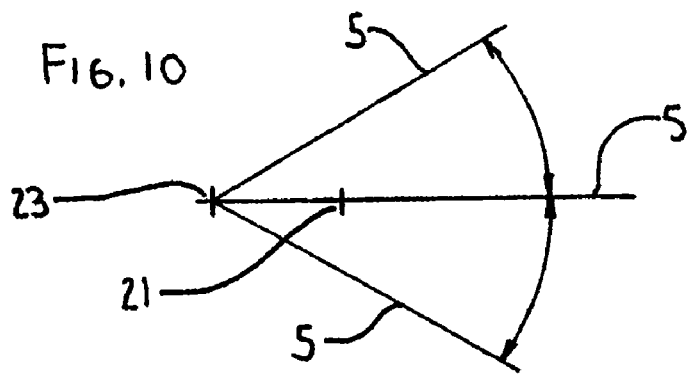
FIG. 10 is a schematic view of the lower saw platform shown in FIG. 9 with the pivot being modified to the left side of the platform.

One important modification of the standard circular saw is shown in FIGS. 9 and 10. FIG. 9 shows the standard construction of this circular saw, including the vacuum impeller housing 9, the vacuum tubes 14 and 14', the saw blade chamber and the bellows 15. This modification to the standard circular requires that the lower base 5 pivot point 21 be changed. In normal operation and production, the lower saw platform 5 pivots by manipulating the lower base adjusting handle 22. This base-adjusting handle (or bolt) 22 is loosened to allow the lower base platform 5 to pivot for angle cuts. Normally, the lower saw platform 5 pivots at pivot point 21.

However, as a modification of the standard saw pivot point, a circular saw of this alternate embodiment may pivot at outer pivot point 23 as best shown schematically in FIG. 10. When the saw lower platform 5 pivots at the modified outer pivot point 23, the saw platform pivots from the outer side of the platform. While this modification of the standard circular saw is an alternate preferred embodiment, the device described herein will also perform satisfactorily with standard, off the shelf circular saws that are commonly found and manufactured in the industry.

The electric motor runs both the saw blade and the impeller. This allows the saw to be self contained and moveable from site to site. The armature supports the impeller.

The dimensions for the various elements can be varied according to the uses and designs of the power saws. For example, the saw blade chamber may be anywhere from two inches wide, as shown approximately in the drawing figures, to twelve inches wide. While the tubes are made of standard rubber, they can also be plastic fabricated tubes. Alternatively the entire shroud around the blade could be made of one piece, and the saw blade casing, impeller vacuum housing, and blade chamber could be manufactured as a one piece, unitary manufactured unit.

As additional enhancements of this invention, lighting inside the blade chamber could be provided. Further, laser guides could be incorporated in this device while still keeping within the spirit and disclosure of this invention. (Obviously, laser guides would be much more effective with the removal of the dust and debris from the normal work site by the vacuum system.) In addition, a peep site could be built into the clear outer plate on the blade side to allow the workman a better view of the blade and its cutting path. The peep site would allow the workman to see the work closer to the actual blade-cutting surface and work piece.

What is claimed is:
1. A portable cutting apparatus, comprising:
   a motor having a drive shaft;
   a cutting blade coupled to said drive shaft for rotating during operation of said motor, said cutting blade defining a cutting plane;
   a protective housing enclosing at least a portion of said cutting blade wherein said protective housing includes a transparent section for viewing said cutting blade during rotation of said cutting blade;
   a bellows connected to said protective housing and extending downwardly therefrom such that said protective housing and said bellows define a blade chamber for said cutting blade;
   a vacuum impeller operably coupled to said motor and rotatable during operation of said motor to generate airflow;
   a vacuum housing enclosing said vacuum impeller, said vacuum housing defining at least one inlet configured to direct the airflow into said vacuum housing and an outlet configured to direct the airflow out of said vacuum housing;
   at least one vacuum tube in communication with said vacuum housing for directing the airflow from said protective housing to said vacuum housing;
   a bag coupled to said vacuum housing for collecting cutting debris and dust present in the airflow moving through said vacuum housing by said vacuum impeller; and
   a lower platform connected to said bellows and defining an opening receiving said cutting blade therethrough, said lower platform having an outer side and being pivotally supported about a pivot axis located at said outer side wherein said pivot axis is spaced outwardly from and parallel to said cutting plane such that said lower platform pivots relative to said cutting blade outside of and spaced from said cutting plane along said outer side of said lower platform with said cutting plane thereby being positioned between said pivot axis and said motor.

2. A portable cutting apparatus as set forth in claim 1 wherein said bellows is flexible such that said cutting blade can be adjusted for depth and angle.

3. A portable cutting apparatus as set forth in claim 1 wherein said at least one vacuum tube in communication with said vacuum housing is further defined as a plurality of vacuum tubes in communication with said vacuum housing for directing the airflow from said protective housing to said vacuum housing.

4. A portable cutting apparatus as set forth in claim 3 wherein said bellows includes a wall separating said bellows into front and rear bellows chambers.

5. A portable cutting apparatus as set forth in claim 4 wherein one of said plurality of vacuum tubes communicates with said front bellows chamber and another of said plurality of vacuum tubes communicates with said rear bellows chamber.

6. A portable cutting apparatus as set forth in claim 4 wherein said cutting blade is partially disposed in said front bellows chamber and said wall separates said cutting blade from said rear bellows chamber.

7. A portable cutting apparatus as set forth in claim 1 further comprising:
   a lower blade guard rotatable about said cutting blade;
   a rod disposed in said blade chamber, said rod having a first end connected to said lower blade guard and a second end protruding out from said protective housing; and
   a handle connected to said second end of said rod for being manipulated by a user to rotate said lower blade guard.

* * * * *